United States Patent [19]
Jenkins et al.

[11] 3,989,673
[45] Nov. 2, 1976

[54] LOW TEMPERATURE CURING RESIN SYSTEM

[75] Inventors: Robert K. Jenkins, Huntington Beach; Boyce G. Kimmel, Palos Verdes Peninsula; Gary Luster, Van Nuys, all of Calif.

[73] Assignee: Hughes Aircraft Company, Culver City, Calif.

[22] Filed: Dec. 30, 1974

[21] Appl. No.: 537,819

[52] U.S. Cl............................. 260/47 EN; 260/2 N; 260/37 EP; 428/444
[51] Int. Cl.$^2$......................................... C08G 30/14
[58] Field of Search ........................ 260/47 EN, 2 N

[56] References Cited
UNITED STATES PATENTS
3,438,937  4/1969  Christie............................ 260/2 N X

OTHER PUBLICATIONS

*Handbook of Epoxy Resins* Lec & Neville, 1967 (pp. 9-9 thru 9-10;10-17).

*Primary Examiner*—Theodore E. Pertilla
*Attorney, Agent, or Firm*—Booker T. Hogan, Jr.; W. H. MacAllister

[57] ABSTRACT

A new system of epoxy resins and curing agents is disclosed which may be cured at low temperatures to yield polymeric materials capable of providing excellent binders for filled systems. The new combination exhibits a useful pot life, and cures at low temperatures to form a tough, dimensionally stable polymer.

5 Claims, No Drawings

LOW TEMPERATURE CURING RESIN SYSTEM

BACKGROUND OF THE INVENTION

1. Field of the Invention

The invention is a new composition of matter which generally relates to epoxy resin and more particularly to low temperature curing resins. Similar materials have been examined by group art unit 120; however, an examination by Group Art Unit 140 would also be appropriate.

2. Description of the Prior Art

Waveguides, used in the electronics industry, have in the past been fabricated from various metals. While such waveguides have been generally considered to be useful, attempts to improve performance, i.e., achieve a reduction in the cost, weight and thermal expansion coefficients while increasing the dimensional stability of waveguides resulted in the investigation of graphite filled composites as structural materials.

The successful utilization of composites in waveguide structures for space applications imposes several important constraints on the resin system and the cured matrix obtained from it. Relatively low curing temperatures should yield a composite with greatly improved dimensional stability, since such a composite would be expected to contain far less residual stresses due to the differential expansion of the matrix and the reinforcement. From a practical standpoint, the candidate resin system must have a reasonable working life at typical ambient temperatures and also have good handling characteristics when combined with collimated graphite fibers. Cured composites, besides having excellent dimensional stability, should be suitable for use in the space environment. Additionally, the cured resin system should have strength properties calculated to preclude the formation of microcracks during environmental temperature cycling.

Waveguides fabricated from graphite filled epoxy systems have found a measure of success in the industry. The principal manufacture of such devices has been RCA. However, the RCA waveguides exhibit unacceptably high dimensional instability when exposed to a wide temperature range.

While it can be concluded that graphite filled epoxy resin systems have utility in the fabrication of waveguides these prior art systems exhibit certain undesirable properties which diminish their usefulness. Generally, conventional graphite filled epoxy systems must be cured at temperatures of nominally 350° F. The cured structures undergo shrinkage upon cooling which tends to be counter productive to the attainment of a composite having high dimensional stability.

Other prior resin systems either have unacceptably high curing temperatures which result in dimensionally unsuitable composites or insufficient pot life at typical ambient temperatures as in the case of resin systems which cure at low temperatures. The latter systems suffer the additional disadvantage of curing to yield a polymer which has poor retention of strength properties at elevated temperatures.

In a brief literature search for candidate resin systems, one system in particular, a DGEBA resin containing a substituted imidazole as hardener, offered promise. Systems of this type were cited* as giving castings with good strength properties and relatively high Tg after curing at the relatively low temperature of 55° C. Also mentioned in the reference was relatively long pot life of this resin system. We examined this system and found it to be unsuitable for our intended purposes. The disadvantage to the use of the imidazole as a hardener for epoxy resins lies in the difficulty experienced in dissolving it in the resin and as discussed below, the exothermic reaction experienced during cure.

*Lee and Neville, Handbook of Epoxy Resins, McGraw-Hill, 1967.

In order to provide a resin which will be useful in the construction of waveguides which possesses none of the aforedescribed disadvantages of prior art resin systems, we have developed a low temperature curing epoxy resin system. Our system fills a definite need for a composite matrix where the ultimate in dimensional stability over a wide temperature range is desirable.

SUMMARY OF THE INVENTION

Applicants have formulated a curing agent which may be added to an epoxy resin to form a resinous system which exhibits a long pot life, and cures at moderately low temperatures to produce a polymeric matrix having superior structural strength in graphite composite applications, low shrinkage and excellent dimensional stability in addition to a low coefficient of curing thermal expansion. The curing agent is comprised of a mixture of piperidine and 2-ethyl-4-methyl imidazole. A standard diglycidyl ether of bis-phenol A epoxy resin is mixed with the curing agent at ambient temperatures to form a curable resin system suitable for impregnation of graphite fibers or serving as a resin matrix for other fillers prior to cure. The system is unique in comparison to conventional epoxy resin systems in that it exhibits a controllable exotherm during mixing and is curable at low temperatures to yield an excellent matrix for composite materials.

DESCRIPTION OF THE INVENTION

We have developed an epoxy resin system suitable for use as a matrix in the fabrication of graphite fiber-reinforced composite structures. It was a purpose of this invention to obtain a resin system which could be prepared and cured at relatively low temperatures to a structurally strong thermally resistant composite with good dimensional stability. Other desirable characteristics were, long working life at ambient temperatures and good handling characteristics such as good drape and tack during layup of the preimpregnated reinforcement.

Cured polymers prepared from this system have a high glass transition temperature and excellent tensile strength properties including a 4.0 percent elongation at failure.

Epoxy resins were investigated because of their general reputation for exhibiting good properties with a minimum of adverse handling problems. However, conventional epoxy-hardener systems were not adequate because of their propensity for exhibiting high exotherms during mixing or necessitating elevated temperatures to achieve good cures.

Our attempts to cure a standard diglycidyl ether of bis-phenol A epoxy resin (DGEBA) with 2-ethyl-4-methyl imidazole resulted in considerable processing difficulties which led to the abandonment of this formulation. The imidazole is a solid which could only be dissolved into the resin with some difficulty. In addition, the system underwent an excessive exothermic reaction during cure.

Other curing agents were investigated with various epoxy resins. For example, a resin system composed of Epon 828* and piperidine was examined. This system exhibited an excessive exotherm at room temperature during mixing, a short pot life following mixing, high shrinkage during cure and poor physical properties when cured.

*Commercial name for diglycidyl ether of bis-phenol A having an epoxide equivalent weight of 180–195.

Subsequent investigations of epoxy hardener candidates resulted in the preparation of a curing agent mixture comprised of 2-ethyl-4-methyl imidazole and piperidine. The imidazole when mixed with piperidine at an elevated temperature will dissolve and remain liquid upon cooling, thereby forming a stable eutectic solution. This solution dissolves readily into the epoxy resin at room temperature. A slight exothermic reaction occurs during this step which is easily controlled by conventional cooling methods. The addition of the piperidine-imidazole mixture to the epoxy resin formed a resinous system suitable for impregnating graphite fibers capable of being cured at relatively low temperatures.

A number of secondary amine mixtures were evaluated wherein the ratio of piperidine to the imidazole varied from 1:9 to 5:5. Each mixture resulted in somewhat of an improvement in the handling characteristics. The exotherm decreased as the ratio of imidazole was decreased and cures were achieved at temperatures as low as 50° C.

Our preferred embodiment of this invention is exemplified by preparing a curing agent comprised of 4:6 parts by weight ratio of piperidine to 2-ethyl-4-methyl imidazole which may be added 10 parts by weight to 100 parts by weight of a standard diglycidyl ether of bis-phenol A epoxy. The room temperature outlife of the resin was greater than 20 hours and the mixture cures very smoothly with no objectional exotherm at 50° C. This resin exhibited excellent structural properties as shown in the following table.

| Properties of Cured Resin Comprised of 4, 6 PIM | |
|---|---|
| Tensile strength | - 10.2 × 10$^3$ psi |
| Tensile modulus | - 0.41 × 10$^6$ psi |
| Elongation at failure | - 4. percent |
| Moisture pickup at 92% humidity | - 1.9 percent after 220 hours |
| Coefficient of thermal expansion | - 46 $\mu$ in/in. ° F. |

Laminates prepared from this resin and graphite fibers exhibited a glass transition temperature of greater than 150° C and there appears to be very little (less than 5%) shrinkage of the resin upon post curing at 50° C for extended periods. However, shrinkage resulting from post cure past the gelation point (which occurred after 155 minutes of cure at 50° C) was less than 2.4%.

This invention can be prepared and utilized by following the specific example shown below.

1.0 Preparation of the mixed amines to form a eutectic solution at room temperature.

To 40 grams of piperidine was added 60 grams of 2-ethyl-4-methyl imidazole, The mixture was heated to about 60° C causing the solid imidazole to melt and form a solution. The solution was cooled to room temperature (25° C) and remained in the liquid state thus indicated the formation of a liquid eutectic system.

2.0 Preparation of resin system.

Ten grams of the liquid eutectic system designated as 4,6-PIM was added to the 100 grams of a diglycidyl ether of bisphenol-A designated Epon 828. The solution was well stirred for a period of about 30 to 45 minutes during which time a slight exotherm developed causing a temperature increase from 25° C to about 33° C. Further stirring reduced the temperature to about 28° C at which time the resin was used as a "neat" system or diluted with acetone.

3.0 Preparation of Preimpregnated Graphite.

A resin-impregnated, collimated graphite prepreg was made by dip-coating graphite "tow" (each tow consisting of ten thousand individual graphite fibers) in a solution of the epoxy resin system and collimating the resin-coated graphite by a drum-winding procedure. The epoxy resin system was diluted with acetone to obtain a resin solution with a density of 0.90 gm/cc. The coated graphite was wound on an 18 inch diameter drum covered with a layer of separator paper with the feed adjusted to give the desired number of graphite tows/inch of width. After completing the winding, the epoxy-coated graphite was cut across the width and removed in the form of a large sheet. This sheet of material was then sandwiched between two sheets of separator paper and squeezed until complete contiguity was achieved between adjacent tows. The resulting collimated prepreg was stored at 0° F until ready to use.

4.0 Fabrication of Composites.

Composites were made by curing a layup of graphite prepreg in an autoclave. The layup used consisted of six-ply, symmetrical 0 + 60° layup, that is, 0°, +60°, −60°, −60°, +60°, 0°. The layup was bagged in the usual way with a polyamide film and vacuum bag sealing compound and cured in an autoclave at nominally 122° F and 100 psig for a period of 16 hours.

Having fully described the invention and disclosed a recipe for its utilization which teaches those skilled in the art how to make and use the invention without undue experimentation, the nature and scope of our claims may now be understood.

What is claimed is:

1. A low temperature curing epoxy resin system comprised of a polymerizable glycidyl ether epoxy resin and a curing agent consisting of an eutectic mixture of piperidine and an alkyl substituted imidazole.

2. The resin system of claim 1 wherein said curing agent is of from 9 to 5 parts by weight of 2-ethyl, 4-methyl imidazole and from 1–5 parts by weight of piperidine.

3. The resin system of claim 2 wherein said epoxy resin is a diglycidyl ether of bis-phenol A having an epoxide equivalent weight of 180–190.

4. The resin system of claim 2 wherein 10 parts by weight of said curing agent is added to 100 parts by weight of a diglycidyl ether of bis-phenol A.

5. The resin system of claim 4 wherein said curing agent consists of 4 parts by weight of piperidine and 6 parts by weight of 2-ethyl, 4-methyl imidazole.

* * * * *